OR 3,639,035

Irie

[54] SYNTHETIC RESIN STRUCTURES FOR LIGHT CONDUCTION AND PRODUCTION THEREOF

[72] Inventor: Masanori Irie, Amagasaki-shi, Japan
[73] Assignee: Nippon Selfoc Kabushiki Kaisha, Tokyo-to, Japan
[22] Filed: Jan. 13, 1970
[21] Appl. No.: 2,669

[30] Foreign Application Priority Data

Jan. 23, 1969 Japan......................44/4957

[52] U.S. Cl......................350/96 R, 350/175 GN, 350/178, 350/320
[51] Int. Cl.........................G02b 5/14, G02b 1/04
[58] Field of Search..........350/96 R, 96 B, 96 WG, 175 GN, 350/178, 320

[56] References Cited

UNITED STATES PATENTS

| | | | |
|---|---|---|---|
| 3,485,556 | 12/1969 | Naujokas | 350/175 GN X |
| 3,320,114 | 5/1967 | Schulz | 350/96 X |
| 3,434,774 | 3/1969 | Miller | 350/96 X |
| 3,212,401 | 10/1965 | Navias | 350/175 GN X |
| 3,495,511 | 2/1970 | Javorik | 350/175 GN X |

[5] 3,639,035
[5] Feb. 1, 1972

APPLICATIONS

39/6810 1964 Japan

OTHER PUBLICATIONS

Miller, Article in Bell System Technical Journal Vol. 44 No. 9 Nov. 1965 pgs. 2,017- 2,030 cited
Kawakami et al., Article in Proceedings of the IEEE Dec. 1965 pgs. 2,148 & 2,149 cited

*Primary Examiner*—David H. Rubin
*Attorney*—Robert E. Burns and Emmanuel J. Lobato

[57] ABSTRACT

A polymer in the form of a transparent bar or fiber having bridges due to ionic bonding of carboxylic groups and metals and having a compositional distribution wherein the concentrations of at least two of the metals vary progressively from the central axis toward the outer surface of the bar or fiber, whereby the refractive index thereof varies progressively in directions transverse to the axis. A bar or fiber of this character can be produced by immersing a polymer bar or fiber having bridges due to ionic bonding of carboxylic groups and metals in a medium containing ions of at least one other metal different from any of the first-mentioned metals to cause ions of the metals originally in the resin body to be substituted by ions of the other metal.

10 Claims, No Drawings

SYNTHETIC RESIN STRUCTURES FOR LIGHT CONDUCTION AND PRODUCTION THEREOF

BACKGROUND OF THE INVENTION

This invention relates generally to light-conducting materials and structures and more particularly to new synthetic resin structures for light conduction in which the refractive index thereof varies progressively in directions transverse to the direction in which light is to advance therethrough. The invention furthermore relates to a new process for producing these light-conducting structures.

Synthetic resin structures for light conduction known heretofore have been mostly of the type comprising a core body for light conduction having a relatively high refractive index and a covering layer of relatively low refractive index enveloping the core body. Incident light rays introduced into one end of a light-conducting structure of this type advance therethrough by repeated total reflection, whereby phase velocity lag between light rays develops, and light ray losses are caused by the reflection.

As one measure to overcome these defects, a glass structure in which the refractive index thereof decreases progressively from the centerline thereof toward the outer surface has been proposed (as disclosed in copending U.S. Pat. application No. 806,368 filed on Mar. 12, 1969, and entitled "Light-conducting Glass Structures and Production Thereof" and assigned to the assignee of this application.

SUMMARY OF THE INVENTION

It is an object of the present invention to provide a new synthetic resin structure for light conduction which as in the case of the above-mentioned glass structure, is not accompanied by the above-described defects and, moreover, simultaneously possesses the features of lower production cost and lower weight than the glass structure and of high flexibility.

Another object of the invention is to provide a process for producing light-conducting resin structures of the above-stated character.

According to the present invention in one aspect thereof, briefly summarized, there are provided synthetic resin structures for light conduction in the form of transparent bars of fibers each comprising a polymer having bridges due to ionic bonding of carboxylic groups and metals, in which the concentrations of at least two of the metals vary progressively from the central axis toward the outer surface of the structure, whereby the refractive index of the structure varies progressively in directions transverse to the axis.

According to the present invention in another aspect thereof, there is provided a process for producing light-conducting structures of the above-specified character which comprises causing a bar or fiber of a synthetic resin having bridges due to ionic bonding of carboxylic groups and metals to contact ions of at least one other metal differing from any of the first-mentioned metals thereby to cause ions of the metals originally within the resin bar or fiber to be substituted by ions of the other metal.

The nature, principle, and utility of the invention will be more clearly apparent from the following detailed description beginning with general considerations and concluding with specific examples of practice illustrating preferred embodiments of the invention.

DETAILED DESCRIPTION

A synthetic resin structure for light conduction of the invention, in general, consists of a synthetic resin body in the form of a transparent bar or a filament or fiber having bridges due to ionic bonding between carboxyl groups and metals and, moreover, has a compositional distribution such that the concentration of at least two of the metals varies progressively from the centerline toward the outer surface of the structure, whereby the refractive index thereof also varies progressively from the centerline toward the outer surface. A suitable resin for use as a starting material in carrying out the invention is disclosed, for example, in Japanese Pat. Publication No. Sho–39–6810.

A particularly desirable distribution of the metal concentration is one which produces a refractive index distribution substantially representable by the following equation in any cross section of the structure perpendicular to the centerline thereof.

$$n = n_0(1 - ar^2),$$

where $n_0$ is the refractive index at the centerline, $n$ is the refractive index at points at a distance $r$ from the centerline, and $a$ is a constant.

When the constant $a$ is of positive value, there is afforded a synthetic resin structure for light conduction of particular importance according to the invention. When incident light rays are introduced into one end of the structure, each light ray is conducted to the other end as it advances with repeated undulations about the centerline with a period equal to $2\pi/\sqrt{2a}$ with almost no phase velocity lag or light loss due to reflection.

Furthermore, this synthetic resin structure for light conduction has properties equivalent to those of a single convex lens or a group of a plurality of combined convex lenses and, moreover, is capable also of conducting optical images.

When the constant $a$ is of negative value, the structure has the same properties as those of a concave lens in the case where its length in the axial direction is relatively short and can be utilized for purposes such as correction of chromatic aberration of a concave lens of small diameter.

Polymers which are suitable for use in the production of the synthetic resin structures for light conduction according to the invention and have bridges due to ionic bonding of carboxyl groups and metals are produced, as set forth in Japanese Pat. Publication No. Sho 39–6810, by causing ionic metal compounds to react with copolymers of $\alpha$-olefins such as ethylene, propylene, 1-butylene, and 1-pentylene and $\alpha\cdot\beta$-ethylenically unsaturated carboxyl acids such as acrylic acid, methacrylic acid, itaconic acid, maleic acid, fumaric acid, and monoesters of dicarboxylic acids among these.

For the metal compounds, salts, hydroxides, methoxides, and ethoxides of almost all metals can be used. However, since ions of the metals constituting the metal compounds are caused to diffuse within the synthetic resin structure in a subsequent process step, it is preferable that these metals include an alkaline metal or another metal which can take the form of monovalent ions which metals can readily diffuse within the synthetic resin.

The synthetic resin structures of the invention are formed by any of known methods into filament or fibers or into bars of diameters or maximum cross-sectional dimensions of the order of from 0.01 mm. to 5 mm.

To impart a refractive index gradient to a synthetic resin structure having a uniform refractive index as described above, the structure is caused to contact ions of other metals differing from the metal ions existing in the structure. This contact process can be carried out simply by immersing the structure in a solution containing the metal ions. Since the metal ions are preferably alkaline metal ions or other monovalent metal ions which diffuse readily within the synthetic resin structure, it is preferable to use for this solution an aqueous solution or a methanol solution of a salt, hydroxide, methoxide, or an ethoxide of the alkaline metal or another metal which can become monovalent ions.

By immersing the resin structure in the solution and maintaining the solution and structure at a temperature conductive to diffusion of the metal ions within the resin structure, the metal ions within the solution can be caused to diffuse into the interior of the resin structure from the contact surfaces between the solution and the structure, whereby a portion of the metal ions initially existing in the resin structure diffuse and migrate out of the structure. As a result, the metal ions within the resin structure near the contact surfaces are substituted by the metal ions contained within the solution.

The concentration within the resin structure of the metal ions which have diffused into the resin structure from the solutions is higher in regions closer to the contact surfaces, i.e., the outer surface of the structure, and decreases with distance inward from the outer surface. Inversely, the concentration within the resin structure of the metal ions which originally existed therewithin is lower in regions closer to the outer surface and increases with distance inward from the outer surface.

In the case where the ion polarizability of the metal ions contained in the solution is lower than that of the metal ions contained within the resin structure, the refractive index of the structure after ion substitution has a distribution such that it is lower in regions closer to the outer surface and progressively increases with distance inward and away from the outer surface to approach the refractive index of the original resin structure.

On the other hand, in the case where the polarizability of the metal ions contained within the solution is higher than that of the metal ions contained within the structure, the refractive index of the structure has a distribution such that it is higher in regions closer to the outer surface and progressively decreases with distance inward and away from the outer surface to approach the refractive index of the original resin structure.

I have found that the distribution of refractive index of a synthetic resin structure for light conduction is determined by various factors, the most important of which are the composition of the copolymer, dimensions and shape of the structure, the kind and concentration of the metals initially existing within the resin structure, the composition and concentration of the solution used in the ion-substitution process, and the temperature and time duration of the ion-substitution process.

In order to indicate still more clearly the nature and utility of the invention, the following specific examples of practice illustrating preferred embodiments of the invention and results are set forth, it being understood that these examples are presented as illustrative only and that they are not intended to limit the scope of the invention.

EXAMPLE 1

Fifty grams (g.) of copolymer prepared by causing 15 parts of methacrylic acid and 100 parts of ethylene to copolymerize was dissolved in 500 cc. of xylene. Separately, 30 g. of cesium hydroxide was dissolved in 100 cc. of methanol, and the resulting solution was added to the first solution of the copolymer in the xylene as all ingredients were maintained at a temperature of 90° C. The resulting product was washed with water and acetone and dried.

The copolymer thus prepared was found to have bridges due to ionic bonding of carboxyl groups and metal (cesium). This copolymer was formed into structure of fibrous form of a diameter of approximately 0.5 mm., which was found to have a refractive index of 1.524.

Next, for the purpose of establishing a refractive index gradient within this copolymer fiber, it was immersed for 10 days in a solution of 120 g. sodium hydroxide in 500 cc. of water, which solution as maintained at 60° C. As a result of this process step, exchange of cesium ions within the copolymer structure and sodium ions within the solution occurred through the outer surface of the copolymer structure, and this ion substitution spread progressively into the interior regions of the copolymer structure.

The copolymer structure of fibrous form thus produced was found to have a refractive index of 1.523 at its centerline (value of $n_o$ in the equation set forth hereinbefore) and 1.510 at its outer surface. The refractive index distribution in each cross section of this fiber conformed substantially to the equation for $n$.

When the two ends of a piece of this fiber were ground to form polished planar surfaces perpendicular to the centerline thereof, the fiber was found to be suitable for use as light-conducting structure. That is, when incident light of a constant time width was introduced into one end of this fibrous structure, the light was conducted to the other end as its time width was maintained substantially constant without phase velocity lag and without light loss due to reflection.

EXAMPLE 2

Fifty grams of a copolymer prepared by causing 13 parts of itaconic acid and 100 parts of ethylene to copolymerize was dissolved in 500 cc. of xylene to form a first solution. To this first solution maintained at 100° C., a second solution prepared by dissolving 25 g. of rubidium hydroxide in 100 cc. of ethanol was added, and the resulting product was washed with water and acetone and then dried.

The copolymer which was thus obtained, and which had bridges due to ionic bonding to carboxyl groups and metal (rubidium), was formed into a fibrous structure of a diameter of approximately 0.3 mm. This copolymer structure was found to have a uniform refractive index of 1.519.

Next, this copolymer fiber was immersed for eight days in an aqueous solution of 100 g. of lithium carbonate in 100 cc. of water, which solution was maintained at 65° C.

The copolymer fibrous structure thus produced was found to have a refractive index of 1.518 (value of $n_o$ in the equation set forth before) at its centerline and of 1.508 at its outer surface. The refractive index distribution in any cross section of the structure was found to conform substantially to the equation for $n$.

When the two ends of a piece of this fibrous structure was ground to form polished planar surfaces perpendicular to the centerline thereof, the structure was found to be suitable for use in light conduction and to exhibit a high performance equivalent to that of the product of Example 1.

I claim:

1. A synthetic resin structure for conducting light having a lens effect comprising a transparent barlike or fiberlike body; said body initially having a uniform refractive index radially from a center axis toward a side surface of the body; said body comprising (1) a copolymer of an $\alpha$-olefin and an $\alpha, \beta$-ethylenically unsaturated carboxylic acid, (2) ions of a first metal initially in a uniform concentration distribution and (3) ions of a second metal different from said first metal in ion polarizabilities thereof, ions of both metals being in ionic bond with carboxylic groups of said carboxylic acid; said body having a gradient refractive index formed by diffusion of the ions of said second metal inwardly into said body through the surface and having a concentration distribution of ions of said second metal produced by said diffusion; said body having a concentration distribution of ions of said first metal produced by ion-exchange between the ions of said first metal and the ions of said second metal, the concentration of the first metal ions decreasing progressively from said center axis toward said side surface and the concentration of the second metal ions increasing progressively from said center axis toward said side surface; said concentration distribution effectively creating within the body a refractive index distribution such that the refractive index in any cross section perpendicular to said center axis varies in conformance substantially with the equation $n=n_o(1-ar^2)$, wherein $n_o$ is the refractive index at said center axis, $n$ is the refractive index at a distance $r$ from the center axis, and $a$ is a constant, whereby said refractive index distribution produces said lens effect.

2. A synthetic resin structure for conducting light having a lens action as claimed in claim 1, in which ions of said first and second metal are selected from the group consisting of ions of alkaline metals and monovalent metals.

3. A synthetic resin structure for conducting light having a lens action as claimed in claim 1, in which said copolymer is selected from copolymers of methacrylic acid and ethylene, said first metal is cesium, said second metal is sodium, and said constant $a$ is positive.

4. A synthetic resin structure for conducting light having a lens action as claimed in claim 1, in which said copolymer is a copolymer of itaconic acid and ethylene, said first metal is rubidium, said second metal is lithium, and said constant $a$ is positive.

5. A process for producing a synthetic resin structure for conducting light having a lens effect which comprises steps of:

preparing a transparent barlike or fiberlike body, said body having a uniform index of refraction radially relative to a center axis toward a side surface of the body, said body comprising (1) a copolymer of an $\alpha$-olefin and a $\alpha, \beta$-ethylenically unsaturated carboxylic acid, and (2) ions of a first metal ion in a uniform concentration distribution and in ionic bond with carboxylic groups of said acid; and causing the body to contact a source of ions of a second metal different from said first metal in ionic polarizabilities thereof at a temperature at which the ions of said first and said second metals can diffuse within said body thereby to diffuse the ions of said second metal into the body through the side surface and to diffuse the ions of said first metal toward the side surface thereby to produce concentration distribution of the ions within said body such that the concentrations of ions of said first metal and said second metal respectively decreases and increases both from the center axis toward the side surface, whereby said concentration distribution effectively creates within the body a refractive index distribution wherein, the refractive index in any cross section perpendicular to said center axis varies in conformance substantially with the equation $n=n_0(1-ar^2)$, wherein $n_0$ is the refractive index at said center axis, $n$ is the refractive index at a distance $r$ from the center axis, and $a$ is a constant.

6. A process for producing a synthetic resin structure for conducting light having a lens action as claimed in claim 5, in which said step of preparing comprises causing a copolymer of an $\alpha$-olefin and an $\alpha, \beta$-ethylenically unsaturated carboxylic acid to react with an ionic metal compound selected from the group consisting of salts, hydroxides, methoxides, and ethoxides of metals including at least one metal selected from the group consisting of alkaline metals and other metals which can take the form of monovalent ions, said alkaline metals and other metals being readily diffusable within the body, and said source of the ions of said second metal is a member selected from the group consisting of salts, hydroxides, methoxides, and ethoxides of metals including at least one metal selected from the group consisting of alkaline metals and other metals which can take the form of monovalent ions, said alkaline metals and other metals being readily diffusable within the body.

7. A synthetic resin structure for conducting light having a lens effect comprising a transparent barlike or fiberlike body; said body comprising (1) a copolymer of an $\alpha$-olefin and an $\alpha, \beta$-ethylenically unsaturated carboxylic acid, (2) ions of a first metal and (3) ions of a second metal different from said first metal in ion polarizabilities thereof, ions of both metals being in ionic bond with carboxylic groups of said carboxylic acid; said body having a concentration distribution of ions such that the concentration of the first metal ions decreases progressively from a center axis toward a side surface of the body and the concentration of the second metal ions increases progressively from said center axis toward said side surface; said concentration distribution effectively creating within the body a refractive index distribution such that the refractive index in any cross section perpendicular to said center axis varies in conformance substantially with the equation $n=n_0(1-ar^2)$, wherein $n_0$ is the refractive index at said center axis, $n$ is the refractive index at a distance $r$ from the center axis, and $a$ is a constant, whereby said refractive index distribution produces said lens effect.

8. A synthetic resin structure for conducting light having a lens action as claimed in claim 7, in which ions of said first and said second metals are selected from the group consisting of ions of alkaline metals and monovalent metals.

9. A synthetic resin structure for conducting light having a lens action as claimed in claim 7, in which said copolymer is selected from copolymers of methacrylic acid and ethylene, said first metal is cesium, said second metal is sodium, and said constant $a$ is positive.

10. A synthetic resin structure for conducting light having a lens action as claimed in claim 7, in which said copolymer is a copolymer of itaconic acid and ethylene, said first metal is rubidium, said second metal is lithium, and said constant $a$ is positive.

* * * * *